E. H. BRISTOL & W. E. GOODYEAR.
MEASURING OR CONTROLLING INSTRUMENT.
APPLICATION FILED APR. 20, 1908.
1,188,615.  Patented June 27, 1916.
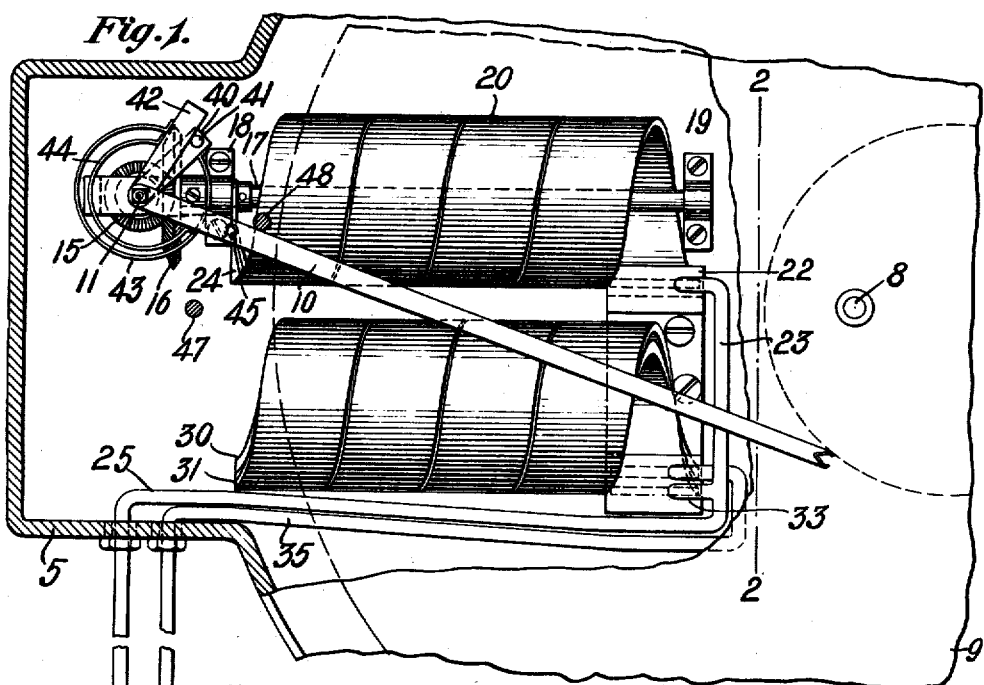
Witnesses:
Inventors:
Edgar H. Bristol,
Watson E. Goodyear;
by Emery & Booth, Attys.

UNITED STATES PATENT OFFICE.

EDGAR H. BRISTOL AND WATSON E. GOODYEAR, OF NAUGATUCK, CONNECTICUT, ASSIGNORS TO THE INDUSTRIAL INSTRUMENT COMPANY, OF WATERBURY, CONNECTICUT, A CORPORATION OF CONNECTICUT.

MEASURING OR CONTROLLING INSTRUMENT.

1,188,615.  Specification of Letters Patent.  Patented June 27, 1916.

Application filed April 20, 1908. Serial No. 428,032.

*To all whom it may concern:*

Be it known that we, EDGAR H. BRISTOL and WATSON E. GOODYEAR, both citizens of the United States, and residents of Naugatuck, in the county of New Haven and State of Connecticut, have invented an Improvement in Measuring or Controlling Instruments, (Case F,) of which the following description, in connection with the accompanying drawings, is a specification, like letters on the drawings representing like parts.

This invention pertains to that class of instruments wherein changes in the condition of a fluid (*e. g.* changes in volume, pressure or the like) are utilized to perform some desired measuring, indicating or governing office. Such instruments are exemplified in recording and other pressure gages, thermometers, temperature-controlled regulators and the like. As will appear to those skilled in the art, the present invention is variously applicable to instruments of this class.

To illustrate one practicable mode of utilizing the features of the invention, the same will be described herein as embodied in a fluid-governed thermometer, adapted in a preferred form to record temperatures upon a suitable chart.

It is to be understood, of course, that the invention is not limited to the specific construction and organization illustrated in the drawings; nor to the specific operation and use described herein for exemplification.

In the drawings: Figure 1 is a plan view, partly broken away, of an instrument embodying the features of the invention, a fragmentary view of the chart being there shown; Fig. 2, a detached perspective on a line 2—2 of Fig. 1, showing the major elements of a thermometer in end elevation; Fig. 3, a plan view similar to that of Fig. 1, showing certain parts on an enlarged scale, in different positions from those illustrated in Fig. 1; Fig. 4, a section on the line 4—4 of Fig. 3; and Fig. 5, a sectional view illustrating the proportions of two fluid-governed, expansible members hereinafter referred to.

Referring now to the drawings, the mechanism of the instrument may be mounted in a suitable case 5 having therein a time train such as a clock movement (not shown), arranged to drive a spindle 8. A circular dial 9, graduated as desired, may be mounted upon and driven by the spindle 8 in any practicable manner, so that units of angular movement thereof may serve graphically to represent periods of time. An index or pointer, in the illustrated instance a pen index 10, pivoted on a shaft 11, may be arranged to travel in a generally radial direction over the sheet 9, in order to indicate or record thereon a temperature or pressure prevailing at or during any instant or period of time.

The preceding detailed description refers to elements already well-known in the art; and these may be replaced by any desired equivalent or substituted devices. The pen index 10 serves merely to exemplify any practicable working device which may suit the purposes for which a particular instrument is intended, whether for recording or merely indicating, or for regulating or governing some collateral instrument or apparatus.

The illustrative working device or index 10 is mounted on a shaft 13 to swing freely thereon. Said shaft is suitably journaled in the casing 5. The working device 10 is actuated in the performance of its desired recording, indicating or other office by having the same suitably coupled to the shaft 13. The manner in which the shaft 13 is governed will be first described.

Fixed upon the shaft 13 is a bevel gear 15, meshing with a gear 16 mounted upon a second shaft 17 journaled in brackets 18, 19 projecting from the bottom of the casing 5. Preferably the shaft 17 is journaled at its opposite ends or at separated parts thereof so as to supply a firm support serving to maintain the same in proper axial alinement. A fluid-governed, expansible member, exemplified by a helical tube 20, may encircle the shaft 17; and in the specific instance shown one end of the helical tube 20 is fixed in a bracket 22, at which a duct 23 communicates with the interior of said tube. Some part of the tube, as for example the free end which may be closed, is connected to the shaft by means of a tongue 24. Said tongue may have a collar encircling the shaft and pinned or otherwise fixed thereto; the other extremity of the tongue being soldered or otherwise attached to the tube. If the tube 20 be filled with a fluid and the volume or pressure thereof be increased it has the tendency to unwind the helical tube and cause its free end to rotate about the axis of the helix, thereby tending to rotate the shaft 7 and gear 16, and thereby to drive the gear 15 and shaft 13. The duct 23 may communicate by an extension 25 or otherwise with a more or less distant thermometer bulb 26; and the entire system, from the bulb through the ducts and including the tube 20, may be filled with a suitable fluid, as alcohol; with this arrangement a rise in temperature in the system causes an expansion of the fluid and thereby produces a rotary tendency on the part of the tube 20.

In order to eliminate from the operation of the tube 20 or other expansible element any movement which might result from expansion of liquid due to temperature changes of the tube itself or to temperature changes at other parts of the system than the immediate bulb 26, the invention contemplates compensating devices, such for instance as those about to be described.

Mounted in any practicable manner, preferably within the casing 5 and near the tube 20, are two auxiliary expansible members, as tubes 30 and 31, so arranged that movement of one may cause movement of the other. In the specific arrangement the tubes 30 and 31 are wound in the same direction, one inside the other, and one end of each is fixed to the bracket 22 mounted upon the bottom of the casing 5. The other, preferably blind, ends of the tubes 30 and 31 may be secured rigidly together, as by soldering them. A branch 33 from the duct 23 communicates with the interior of the outer tube 31 and supplies communication between the tube 20 and said tube 31. Preferably an independent duct 35 communicates with the interior of the inner tube 30; and said duct may parallel the duct 25 and terminate in a blind end 36 proximate the bulb 26 or other source of pressure or fluid control to be measured or otherwise utilized. This specific arrangement involves two containing systems—one comprising the tube 20, duct 23, branch 33, tube 31, duct 25 and bulb 26; the other comprising the tube 30 and duct 35, terminating at the blind end 36. For the purposes of the specific organization, these two systems are each completely filled with a fluid, as alcohol. The internal volume or capacity of the tube 30 is preferred to be greater than that of the outer tube 31, as by being substantially twice as great; and a practicable proportioning of the dimensions of the two tubes is illustrated in Fig. 5. It will be observed in the specific disclosure that there is no communication between the tube 30 and the tube 31; but the two are mechanically connected at their unattached, blind ends, as by being rigidly soldered together.

With the described arrangement a change in temperature in the vicinity of the casing 5 may cause an expansion of the fluid in the tube 20; and it will also cause an expansion in the other tubes 30 and 31. The tubes 20 and 31 may have equal internal volumes or capacities, so that the expansions therein with increased temperature may be substantially equal. The expansion in the tube 30 being proportioned to its greater volume will be greater than that in the tube 31; and, consequently the expansile tendency of the tube 30 may have the effect of unwinding the tube 31 to a greater extent than would result from expansion of fluid within the tube 31 itself. Thus the internal volume and capacity of the tube 31 will be increased to a greater extent than is necessary to accommodate the volume of fluid therein increased by expansion under local temperatures; and this will relieve more or less the pressure in the system communicating with the tube 31—i. e. in the branch 33, duct 23 and tube 20, and it may tend, by a species of suction action, to draw fluid from the tube 20 through the duct 23. In this manner any increased volume within the immediate tube 20 tending to expand the same will be compensated by expansion of the tube 30 distending the tube 31 and relieving the increased pressure in tube 20 sufficiently to negative the effect thereof and permit the latter to remain stationary without expansion. Thus the tube 20 and the governed shaft 13 will be undisturbed by changes in local temperature.

It is sometimes desired to use such an instrument as is shown in the drawings at a point remote from the bulb 26; and it is desirable to compensate for any expansion due to conditions prevailing along the system intervening between the bulb 26 and the instrument, as along the duct 25, which may be of any practicable length. To this end the entire system intervening between the bulb and the instrument may be paralleled, as by the duct 35 which communicates with the tube 30. If the fluid in duct 25 expand—tending to increase pressure in the tube 20 and cause the same to operate—expansion in the duct 35 will also occur and will increase pressure in the tube 30, expanding the latter, distending the tube 31 and thereby relieving pressure in the tube 20 sufficiently to compensate for that added by expansion in duct 25.

By suitably proportioning the different tubes or other expansible members (and this may be readily effected empirically) the compensating actions above described may be rendered sufficiently accurate to eliminate substantially all effect upon the major element exemplified by the tube 20, attributable to changes in temperature or pressure at any part of the major system, except at the bulb 26 itself, or its equivalent or substitute. Thus the tube 20 is not materially affected except by changes occurring immediately in the bulb; and such changes alone govern the shaft 13 and working device 10 connected thereto, to the exclusion of all local effects within or outside the instrument.

The preceding description has explained a preferred embodiment of the invention arranged to govern the shaft 13 upon which the working device or index 10 may be loosely mounted. It remains to describe a preferred manner in which the working device 10 may be governed by said shaft or its equivalent or substitute.

In instruments of the character described the major or governing element of the instrument (as the tube 20) may have a range of operation or movement greater than any which is desired to be measured, recorded, indicated or otherwise utilized. For instance, the specific tube 20 may be capable of responding effectively to temperature changes between 100 degrees and 500 degrees; but it may be desired to utilize this capacity only between temperatures of 300 and 400 degrees. If a chart 9 or other scale be employed it may be desired to graduate the same in temperatures from 300 to 400 only, in which case the 100 intervening graduations extending across the entire capacity of the chart may be made on a greater scale than would be the case if the chart presented the entire range of temperatures of which the tube 20 is capable. For this reason, or others, it may be desired to restrict the motion of the working device or index 10 so that it shall be governable only within the appointed range of temperatures or the like desired to be utilized. This may be effected practicably by the illustrative means about to be described.

Referring now to Figs. 1, 3 and 4, a motor arm 40 is fixed upon the shaft 13, and is used to move the working device 10. Fixed in the motor arm 40 is a pin 41, adapted to engage a second arm 42 loosely mounted on the shaft 13 between the motor arm 40 and the working device 10. A spring 43, attached as by soldering at its opposite ends to the motor arm 40 and arm 42, respectively, tends to hold the pin 41 against the arm 42 as shown in Fig. 1. Fixed upon the working device 10 is a pin 45, adapted to engage the arm 42. A spring 44, attached as by soldering at its opposite ends to the arm 42 and working device 10, respectively, tends to hold the pin 45 in contact with the arm 42. With this arrangement the working device 10 may be actuated solely through the agency of one or the other of the springs 43 and 44, so that by introducing appropriate stop means the travel of the working device 10 may be limited as desired. Such stop means are exemplified in Fig. 1 by pins 47 and 48, which may project downwardly into the path of the working device from the top wall or cover (not shown) of the casing 5.

The operation of this mechanism is as follows:—If the motor arm 40 be rotated contra-clockwise, as in Fig. 1, from its dotted line position shown in Fig. 3, its pin 41 will propel the arm 42 in the same direction, causing the spring 44 to propel also contra-clockwise the working device 10. When, however, the latter strikes its stop 48 its movement will be arrested, and further movement of the motor arm 40 will be idle, being consumed merely in distending the spring 44, without effect upon the working device 10. In the other direction of movement—i. e. clockwise from its dotted line position in Fig. 3—the motor arm 40, acting through the spring 43, will drag the arm 42 in the same direction; and the latter abutting against the pin 45 on the working device 10 will carry it in the same direction. When the working device strikes its stop 47 continued movement of the motor arm 40 will merely distend the spring 43 as illustrated in Fig. 3, without other effect.

As will appear to those skilled in the art, instruments or apparatus embodying features of this invention may be used for many different purposes; and the invention is not to be limited to the specific use hereinbefore described. Also, the specific construction and organization disclosed for illustration may be variously changed and modified within the proper scope of the claims. It is by no means indispensable that all the features of the invention be used conjointly since they may be used to advantage separately in the various combinations and subcombinations defined in the subjoined claims.

Claims:

1. In an instrument of the class described, the combination of a working device; a fluid-containing system, to govern the same, responsive to local fluid-condition changes; and means to vary capacity of the containing system in accordance with localized fluid-condition changes to negative effect of the latter upon said fluid-containing system.

2. In an instrument of the class described, the combination of a working device; a fluid-containing system, to govern the same, responsive to fluid-condition changes; and compensating means paralleling part of said system, constructed and arranged to vary capacity of the system in accordance with fluid-condition changes therein to negative effect of the latter on said fluid-containing system.

3. In an instrument of the class described, the combination of a working device; an ultimate source of fluid-control to govern the working device; a fluid-containing system intermediate said source and the working device arranged to govern the latter; and means acting automatically under changes of fluid condition to vary the capacity of said intermediate system to compensate for changes therein in fluid-condition.

4. In an instrument of the class described, the combination of a working device; an ultimate source of fluid-control to govern the working device; a fluid-containing system intermediate said source and the working device arranged to govern the latter; and means acting automatically under changes of fluid condition to vary the capacity of said intermediate system in accordance with fluid-condition changes therein to negative effect of the latter on the working device.

5. In an instrument of the class described, the combination of a working device; a fluid-containing system to govern the same responsive to temperature variations for indicating the latter by said working device, and independent means responsive to temperature variations, to vary capacity of said system; and means operatively connecting said system and said independent means.

6. In an instrument of the class described, the combination of a working device; a fluid-containing system to govern the same responsive to fluid-condition changes for indicating the latter by said working device; and means mechanically connected to said system for automatically varying the capacity thereof under fluid condition changes.

7. In an instrument of the class described, the combination of a working device; a fluid-containing system to govern the same responsive to fluid-condition changes for indicating the latter by said working device; and means independent of said system and mechanically connected thereto for automatically varying the capacity thereof under fluid condition changes.

8. In an instrument of the class described, the combination of a working device; a fluid-containing system to govern the same responsive to fluid-condition changes for indicating the latter by said working device; separate fluid-governed means to vary the capacity of said system, part of said means being arranged to act mechanically on part of said system.

9. In an instrument of the class described, the combination of a working device; a fluid-containing system to govern the same responsive to fluid-condition changes for indicating the latter by said working device; a separate fluid-governed system; and means connecting the systems whereby the second governs the capacity of the first.

10. In an instrument of the class described, the combination of a working device; a pair of separate fluid-governed systems both separately responsive to fluid-condition changes, one said system indicating such changes by the working device; connections between one system and the working device; and a connection between the systems whereby one may govern capacity of the other.

11. In an instrument of the class described, the combination of a working device; a fluid-governed member to operate the same; an auxiliary member of adjustable capacity communicating with said fluid-governed member; and means responsive to variations affecting fluid-condition, to adjust the capacity of said auxiliary member.

12. In an instrument of the class described, the combination of a working device; pressure-responsive means to govern the same; and means substantially to regulate said pressure in accordance with local condition changes to eliminate effect of the latter on the working device.

13. In an instrument of the class described, the combination of a working device; coöperating fluid-responsive systems; means for causing one of them to govern the working device; and means for causing the second system to regulate the responsive action of the first.

14. In an instrument of the class described; the combination of a working device; coöperating fluid-governed systems, one said system having normal operation independently of the other to govern the working device, and the other system governing responsive operation of the first.

15. In an instrument of the class described, the combination of a working device; pressure-responsive means to govern the same; and coöperating separate pressure-regulating means governing the response of said pressure-responsive means by automatically changing the pressure within said pressure-responsive means upon change in fluid condition.

16. In an instrument of the class described, the combination of a working device; a pressure-responsive system to govern operation of the working device; and coöperating regulating means governing response of said system by automatically varying its internal capacity upon change in fluid condition.

17. In an instrument of the class described, the combination of a pivoted, swinging index, pressure responsive means, a yieldable driving connection interposed between said means and said index and stops delimiting the arc of swing.

18. In an instrument of the class described, the combination of a working device; pressure-responsive means to govern the same; means to limit the motion of said working device; and a driving connection between said pressure-responsive means and said working device including an interposed, yielding driving means.

19. In a device of the class described, a pivoted index, a shaft, a crank arm thereon, an intermediate revoluble member, said arm arranged for driving engagement with said member in one direction of rotation and said member arranged for driving engagement with said index in the other and yieldable driving connections between said arm and said member and between said member and said index respectively.

20. In an instrument of the class described, in combination, a working device, a fluid container contractible and expansible under variations of pressure to govern said device; a remote bulb member, 26, communicating with said container, a like container, 31, subject to like local conditions in communication with the first, and a container, 30, constructed for a greater degree of responsive movement and also subject to the local conditions, mechanically connected to said second-mentioned container to impart its movement thereto.

In testimony whereof, we have signed our names to this specification, in the presence of two subscribing witnesses.

EDGAR H. BRISTOL.
WATSON E. GOODYEAR.

Witnesses:
BENNET B. BRISTOL,
HENRY P. DENNIS.

Correction in Letters Patent No. 1,188,615.

It is hereby certified that in Letters Patent No. 1,188,615, granted June 27, 1916, upon the application of Edgar H. Bristol and Watson E. Goodyear, of Naugatuck, Connecticut, for an improvement in "Measuring or Controlling Instruments," an error appears in the printed specification requiring correction as follows: Page 4, line 85, claim 12, for the word "substantially" read *automatically;* and that the said Letters Patent should be read with this correction therein that the same may conform to the record of the case in the Patent Office.

Signed and sealed this 26th day of September, A. D., 1916.

[SEAL.]

F. W. H. CLAY,
*Acting Commissioner of Patents.*

Cl. 73—118.